US012681988B2

(12) United States Patent
  Tanaka et al.

(10) Patent No.: US 12,681,988 B2
(45) Date of Patent: *Jul. 14, 2026

(54) PREDICTION DEVICE

(71) Applicant: NTT DOCOMO, INC., Chiyoda-ku (JP)

(72) Inventors: Shigeki Tanaka, Chiyoda-ku (JP); Yusuke Fukazawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 887 days.

This patent is subject to a terminal disclaimer.

(21) Appl. No.: 18/000,210

(22) PCT Filed: May 28, 2021

(86) PCT No.: PCT/JP2021/020515
  § 371 (c)(1),
  (2) Date: Nov. 29, 2022

(87) PCT Pub. No.: WO2021/251187
  PCT Pub. Date: Dec. 16, 2021

(65) Prior Publication Data
  US 2023/0205814 A1  Jun. 29, 2023

(30) Foreign Application Priority Data
  Jun. 9, 2020  (JP) ................................ 2020-100167

(51) Int. Cl.
  *G06F 16/683* (2019.01)
  *G10H 1/36* (2006.01)
(52) U.S. Cl.
  CPC ........... *G06F 16/683* (2019.01); *G10H 1/361* (2013.01)
(58) Field of Classification Search
  CPC .............................. G06F 16/683; G10H 1/361
  (Continued)

(56) References Cited

U.S. PATENT DOCUMENTS 5,952,597 A * 9/1999 Weinstock ............... G10H 1/00
                                                84/610
8,626,497 B2 * 1/2014 Lin ........................ G10H 1/361
                                                84/613

(Continued)

FOREIGN PATENT DOCUMENTS

JP    2011203479 A * 10/2011
JP    2011209608 A * 10/2011
        (Continued)

OTHER PUBLICATIONS

International Search Report mailed on Aug. 24, 2021 in PCT/JP2021/020515 filed on May 28, 202 (2 pages).

(Continued)

*Primary Examiner* — Christina M Schreiber
(74) *Attorney, Agent, or Firm* — Oblon, McClelland, Maier & Neustadt, L.L.P.

(57) ABSTRACT

An object is to improve accuracy of prediction of a result of scoring relating to user's singing of a new musical piece. A prediction device is a device that acquires a result of scoring relating to a user's singing of a musical piece in the past for each section of the musical piece in time, acquires pitch information representing pitches of notes configuring the musical piece and aligned in a time series in the section, builds a learning model predicting a result of scoring relating to the user's singing of a musical piece from the pitch information using the result of scoring and the pitch information as training data, and acquires a result of scoring relating to the user's singing of a new musical piece on the basis of an output of the learning model by inputting the pitch information about the new musical piece to the learning model.

6 Claims, 12 Drawing Sheets

(58) Field of Classification Search
USPC .......................................................... 84/610
See application file for complete search history.

(56)                        References Cited

U.S. PATENT DOCUMENTS

| | | | | |
|---|---|---|---|---|
| 8,868,411 B2 * | 10/2014 | Cook | .................... | G10L 21/013 |
| | | | | 84/610 |
| 8,889,976 B2 * | 11/2014 | Nakadai | ................. | G10H 1/361 |
| | | | | 84/610 |
| 11,967,302 B2 * | 4/2024 | Maezawa | ............... | G06N 3/047 |
| 12,067,891 B2 * | 8/2024 | Furuya | ................. | A61B 5/6826 |
| 2010/0169085 A1 * | 7/2010 | Ranga Rao | ............ | G10H 1/361 |
| | | | | 704/E19.036 |
| 2011/0251840 A1 * | 10/2011 | Cook | ..................... | G10H 1/366 |
| | | | | 704/207 |
| 2012/0046771 A1 * | 2/2012 | Abe | ......................... | G10H 1/16 |
| | | | | 700/94 |
| 2021/0151014 A1 * | 5/2021 | Maezawa | ................. | G10G 3/04 |
| 2023/0009481 A1 * | 1/2023 | Maezawa | ............. | G10H 1/0008 |
| 2023/0014315 A1 * | 1/2023 | Maezawa | ............. | G10H 1/0008 |
| 2023/0205814 A1 * | 6/2023 | Tanaka | .................. | G06F 16/683 |
| | | | | 84/610 |
| 2023/0215406 A1 * | 7/2023 | Tanaka | ................. | G10H 1/0008 |
| | | | | 84/609 |
| 2025/0239241 A1 * | 7/2025 | Lu | ......................... | G10H 1/0008 |

FOREIGN PATENT DOCUMENTS

| | | | | |
|---|---|---|---|---|
| JP | 2016029429 A | * | 3/2016 | |
| JP | 2018-91982 A | | 6/2018 | |
| JP | 2018091982 A | * | 6/2018 | |
| JP | 6366403 B2 | * | 8/2018 | |
| JP | 2019148767 A | * | 9/2019 | |
| JP | 7117113 B2 | * | 8/2022 | |

OTHER PUBLICATIONS

International Preliminary Report on Patentability and Written Opinion issued Dec. 13, 2022 in PCT/JP2021/020515 (with English Translation of Written Opinion), 8 pages.

* cited by examiner

Fig.2

| USER IDENTIFIER | MUSICAL PIECE IDENTIFIER | SINGING TIME | TOTAL SCORE | SECTION 1 SCORE | SECTION 2 SCORE | ... | SECTION 24 SCORE |
|---|---|---|---|---|---|---|---|
| A1 | 1 | 2018-07-01 22:55 | 90 | 88 | 56 | ... | 70 |
| A1 | 2 | 2018-07-01 22:58 | 88 | 23 | 54 | ... | 82 |
| A1 | 3 | 2018-07-01 23:25 | 77 | 76 | 37 | ... | 92 |
| .. | .. | .. | .. | .. | .. | .. | .. |

*Fig.3*

| MUSICAL PIECE IDENTIFIER | NOTE START TIME (ms) | NOTE END TIME (ms) | PITCH | STRENGTH |
|---|---|---|---|---|
| 1 | 3 | 10 | 50 | 90 |
| 1 | 11 | 12 | 70 | 88 |
| 1 | 13 | 19 | 10 | 77 |
| ⋮ | ⋮ | ⋮ | ⋮ | ⋮ |

Fig.4

| MUSICAL PIECE IDENTIFIER | SECTION START TIME (ms) | SECTION END TIME (ms) |
|---|---|---|
| 1 | 0 | 10 |
| 1 | 11 | 20 |
| 1 | 21 | 30 |
| ⋮ | ⋮ | ⋮ |

*Fig.5*

| USER IDENTIFIER | MUSICAL PIECE IDENTIFIER | SECTION | SCORE | NOTE START TIME (ms) | NOTE END TIME (ms) | PITCH | STRENGTH |
|---|---|---|---|---|---|---|---|
| A1 | 1 | 1 | 88 | 3 | 10 | 50 | 90 |
| A1 | 1 | 2 | 56 | 11 | 12 | 70 | 88 |
| A1 | 1 | 2 | 56 | 13 | 19 | 10 | 77 |
| A1 | 1 | 3 | 60 | 20 | 23 | 40 | 50 |

*Fig.6*

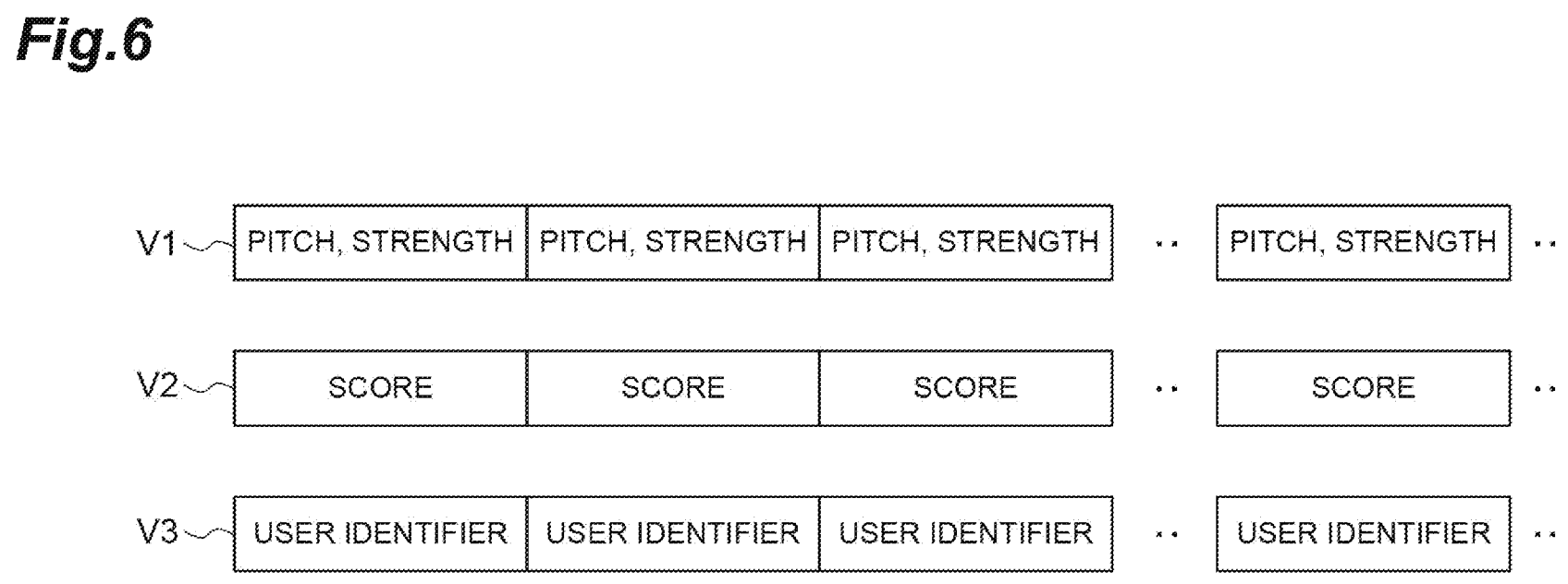

V1 — PITCH, STRENGTH | PITCH, STRENGTH | PITCH, STRENGTH ⋯ PITCH, STRENGTH ⋯

V2 — SCORE | SCORE | SCORE ⋯ SCORE ⋯

V3 — USER IDENTIFIER | USER IDENTIFIER | USER IDENTIFIER ⋯ USER IDENTIFIER ⋯

*Fig.8*

| USER IDENTIFIER A1 | USER IDENTIFIER A2 | USER IDENTIFIER A3 | . . . |
|---|---|---|---|
| 1 | 0 | 0 | . . . |
| 1 | 0 | 0 | . . . |
| 1 | 0 | 0 | . . . |
| : | : | : | : |

SCORE SCORE SCORE

SCORE

PREDICTION DEVICE

TECHNICAL FIELD

One aspect of the present invention relates to a prediction device that predicts a scoring result.

BACKGROUND ART

Conventionally, a karaoke machine predicting a result of scoring of a musical piece that has not been sung by a user from data of a past singing history of the user is used. For example, a device that extracts a result of scoring of a musical piece in which a degree of difficulty that is the same as or approximate to a degree of difficulty of a selected musical piece is set from a user's singing history and predicts a result of scoring of the selected musical piece from the extracted result of scoring is known (see Patent Literature 1 represented below).

CITATION LIST

Patent Literature

[Patent Literature 1] Japanese Unexamined Patent Publication No. 2018-91982

SUMMARY OF INVENTION

Technical Problem

However, according to the conventional device described above, a result of scoring is predicted on the basis of a result of scoring of a musical piece of which a degree of difficulty is close, and thus it is difficult to reflect a singing tendency of a user according to pitch patterns of musical pieces in the result of the prediction. For this reason, there is a limit on the accuracy of a prediction of a result of scoring relating to a user's singing of a new musical piece.

Thus, in order to solve the problems described above, an object is to provide a prediction device capable of improving accuracy of a prediction of a result of scoring relating to a user's singing of a new musical piece.

Solution to Problem

A prediction device according to this embodiment is a prediction device predicting a result of scoring and includes at least one processor, the at least one processor being configured to: acquire a result of scoring relating to a user's singing of a musical piece in the past for each section of the musical pieces in time; acquire pitch information representing pitches of notes configuring the musical piece and arranged in a time series in the section; build a learning model predicting a result of scoring relating to the user's singing of a musical piece from the pitch information using the result of scoring and the pitch information as training data; and acquire a result of scoring relating to the user's singing of a new musical piece on the basis of an output of the learning model by inputting the pitch information about the new musical piece to the learning model.

According to this embodiment, a learning model predicting a result of scoring is built by using a result of scoring for each section relating to a user's singing of musical pieces in the past and pitch information of the section as training data. Then, by inputting pitch information about a new musical piece to the built learning model, a result of scoring of the user's singing of a new musical piece is acquired on the basis of an output thereof. In accordance with this, a result of scoring relating to singing of a new musical piece in which a user's scoring trend for a pattern of pitches in the past is reflected can be acquired, and accuracy of prediction of the acquired result of scoring can be improved.

Advantageous Effects of Invention

According to one aspect of the present invention, accuracy of a prediction of a result of scoring relating to a user's singing a new musical piece can be improved.

BRIEF DESCRIPTION OF DRAWINGS

FIG. 2 is a diagram illustrating an example of a data configuration of history information stored in a data management device 4.

FIG. 3 is a diagram illustrating an example of a data configuration of musical piece information stored in the data management device 4.

FIG. 4 is a diagram illustrating an example of a data configuration of musical piece information stored in the data management device 4.

FIG. 5 is a diagram illustrating an example of a data configuration of history information generated by a prediction device 5.

FIG. 6 is a diagram illustrating an example of a data configuration of a one-dimensional vector generated by the prediction device 5.

FIG. 8 is a diagram illustrating a data configuration of a two-dimensional vector converted by a learning model used by the prediction device 5.

FIG. 9 is a diagram illustrating a data configuration of an output vector output by a learning model used by the prediction device 5.

DESCRIPTION OF EMBODIMENTS

An embodiment of the present invention will be described with reference to the attached drawings. If possible, the same reference signs will be assigned to the same parts, and duplicate description will be omitted.

Figure 1:
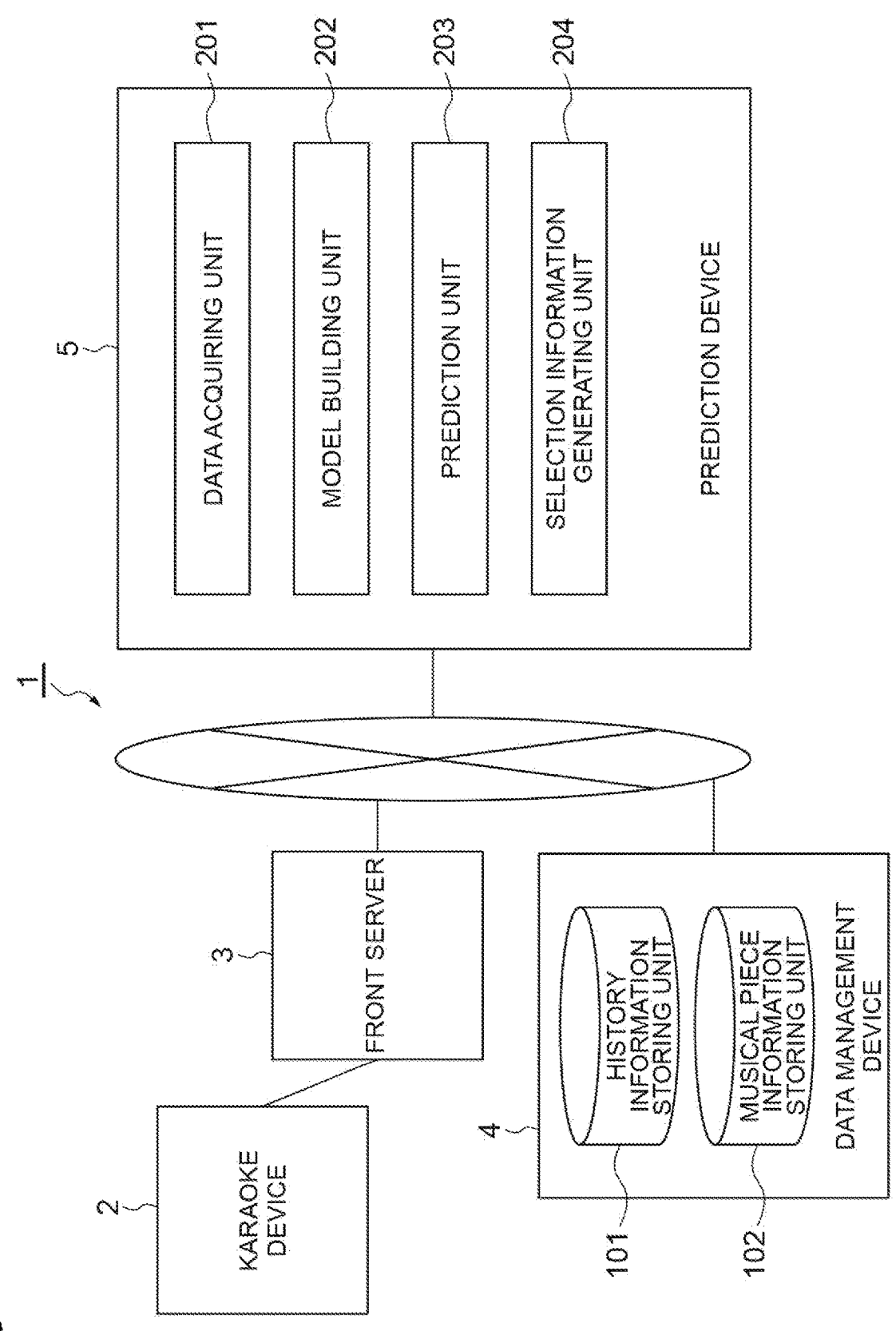
FIG. 1 is a system configuration diagram illustrating a configuration of a karaoke system 1 according to this embodiment.

FIG. 1 is a system configuration diagram illustrating a configuration of a karaoke system 1 according to this embodiment. The karaoke system 1 is device having a known function for reproducing a musical piece designated by a user and a known function for collecting singing vocal sound of a user in accordance with the reproduction and scoring the singing vocal sound through evaluation. This karaoke system 1 also has a function for predicting a result of scoring relating to a user's singing of a new musical piece.

As illustrated in FIG. 1, the karaoke system 1 includes a karaoke device 2, a front server 3, a data management device 4, and a prediction device 5. The front server 3, the data management device 4, and the prediction device 5 are configured to mutually perform transmission and reception of data through a communication network such as a local area network (LAN), a wide area network (WAN), a mobile communication network, or the like.

The karaoke device 2 provides a musical piece reproduction function and a sound collection function for a user's singing vocal sound. The front server 3 is electrically connected to the karaoke device 2 and has a reproduction function of providing reproduction data for reproducing a musical piece designated by a user for the karaoke device 2, a musical piece search function according to a user's operation, a scoring function of receiving data of a singing vocal sound collected by the karaoke device 2 in accordance with reproduction of a musical piece and calculating a result of scoring of the singing vocal sound, and the like. The front server 3 also has a function of storing a result of scoring of a user's singing vocal sound in the data management device 4 each time as history information. This front server 3 provides a user interface for accepting a user's operation and displaying information for a user and includes a terminal device that is connected to the front server 3 in a wired manner or a wireless manner.

The data management device 4 is a data storage device (a database device) that stores data processed by the front server 3 and the prediction device 5. This data management device 4 includes a history information storing unit 101 that stores history information in which results of scoring of a user's singing of musical pieces in the past are recorded and a musical piece information storing unit 102 that stores pitch information about a musical piece that can be reproduced by the karaoke device 2. Various kinds of information stored in the data management device 4 is updated as required, by the process of the front server 3 or using data acquired from the outside.

FIG. 2 illustrates an example of a data configuration of history information stored in the data management device 4, and FIGS. 3 and 4 illustrate examples of a data configuration of musical piece information stored in the data management device 4.

As illustrated in FIG. 2, in the history information, a "user identifier" used for identifying a user, a "musical piece identifier" used for identifying a musical piece sung by the user using the karaoke system 1 in the past, a "singing time" representing a time at which the musical piece was sung in the past, a "total score" representing a result of scoring of singing of all the sections of the musical piece as a target using the function of the front server 3, and "Section 1 score", . . . , "Section 24 score" representing results of scoring of singing of respective sections of the musical piece as a target using the function of the front server 3 are stored in association with each other. In the scoring function of the front server 3, a section of each musical piece in time is divided into a predetermined number of sections (for example, 24), a result of scoring is calculated for each division section, and a result of scoring "total score" of the entire musical piece is calculated from results of scoring of all the sections. In the history information, for singing of each musical piece of each user as a target, a result of scoring of each section and a result of scoring of the entire musical piece, which are calculated by the front server 3, are recorded.

FIG. 3 illustrates an example of a data configuration of pitch information of musical piece information. In this way, in the pitch information, a "musical piece identifier" used for identifying a musical piece that can be reproduced using the karaoke system 1, a "note start time (ms)" representing a start time of a sound (note) configuring the musical piece in the entire musical piece, a "note end time (ms)" representing an end time of the note in the entire musical piece, a "pitch" representing a height (pitch) of the note as a numerical value, and a "strength" representing a strength of the note as a numerical value are stored in association with each other. In the data management device 4, pitch information of all the notes configuring each musical piece that can be reproduced by the front server 3 and arranged in a time series in each musical piece is stored.

FIG. 4 illustrates an example of a data configuration of section information in musical piece information. In this way, in the section information, a "musical piece identifier" used for identifying a musical piece that can be reproduced using the karaoke system 1, a "section start time (ms)" representing a start time of a section of the musical piece in the entire musical piece, and a "section end time (ms)" representing an end time of the section in the entire musical piece are stored in association with each other. In the data management device 4, section information about all the sections configuring each musical piece that can be reproduced using the front server 3 is stored.

The prediction device 5 is a device that predicts a result of scoring for a user's singing of a new musical piece as a target that is acquired using the front server 3 and includes a data acquiring unit 201, a model building unit 202, a prediction unit 203, and a selection information generating unit 204 as functional constituent elements. Hereinafter, the function of each constituent element will be described.

Before a process of building a learning model for predicting a scoring result, the data acquiring unit 201 acquires history information and musical piece information from the data management device 4. In addition, before a process of predicting a scoring result, the data acquiring unit 201 also acquires musical piece information. The data acquiring unit 201 delivers each piece of information that has been acquired to the model building unit 202 or the prediction unit 203.

In other words, at the time of performing the process of building a learning model, the data acquiring unit 201 combines information read from the history information storing unit 101 and the musical piece information storing unit 102 of the data management device 4, thereby generating history information of a result of scoring for each note of each section of a musical piece sung by a user in the past. FIG. 5 illustrates an example of a data configuration of history information generated by the data acquiring unit 201. In this way, in the history information, a "user identifier" used for identifying a user, a "musical piece identifier" used for identifying a musical piece sung by the user in the past, a "section" used for identifying a section of the musical piece, a "note start time (ms)" representing a start time of a note within the section, a "note end time (ms)" representing an end time of the note, a "pitch" representing a pitch of the note as a numerical value, a "strength" representing a strength of the note as a numerical value, and a "score" representing a scoring result of a section in which the note is included are associated with each other. History information about all the notes configuring each musical piece sung by a user in the past is generated by the data acquiring unit 201.

In addition, at the time of performing a process of predicting a result of scoring, the data acquiring unit 201 acquires musical piece information about a new musical piece that is a prediction target from the data management device 4. The data acquiring unit 201 delivers the acquired musical piece information to the prediction unit 203.

Referring back to FIG. 1, the model building unit 202 builds a learning model of machine learning predicting a result of scoring of user's singing of a new musical piece on the basis of the pitch information of a new musical piece using the history information generated by the data acquiring unit 201 as training data. Before building a learning model, the model building unit 202 performs pre-processing for processing the history information delivered from the data acquiring unit 201. In more detail, the model building unit 202 converts each piece of information included in the history information into a one-dimensional vector (note vector) in which information of a pitch and a strength of each note configuring a musical piece sung by a user in the past is aligned. In addition, the model building unit 202 converts each piece of information included in the history information into a one-dimensional vector (a score vector), in which a result of scoring of a section corresponding to each note is aligned, that is one-dimensional vector corresponding to a note vector and a one-dimensional vector (a user identification vector), in which user identification information about a user who sang is aligned, that is a one-dimensional vector corresponding to a note vector.

FIG. 6 illustrates an example of a data configuration of a one-dimensional vector generated using preprocessing of the model building unit 202. In this way, the model building unit 202 converts history information into a note vector V1, a score vector V2, and a user identification vector V3.

Then, the model building unit 202 optimizes parameters of a learning model (trains the learning model) such that an output result of the learning model is close to a score represented by the score vector V2 by inputting the note vector V1 and the user identification vector V3 to the learning model. At this time, the model building unit 202 uses a learning model of deep learning as the learning model.

Figure 7:
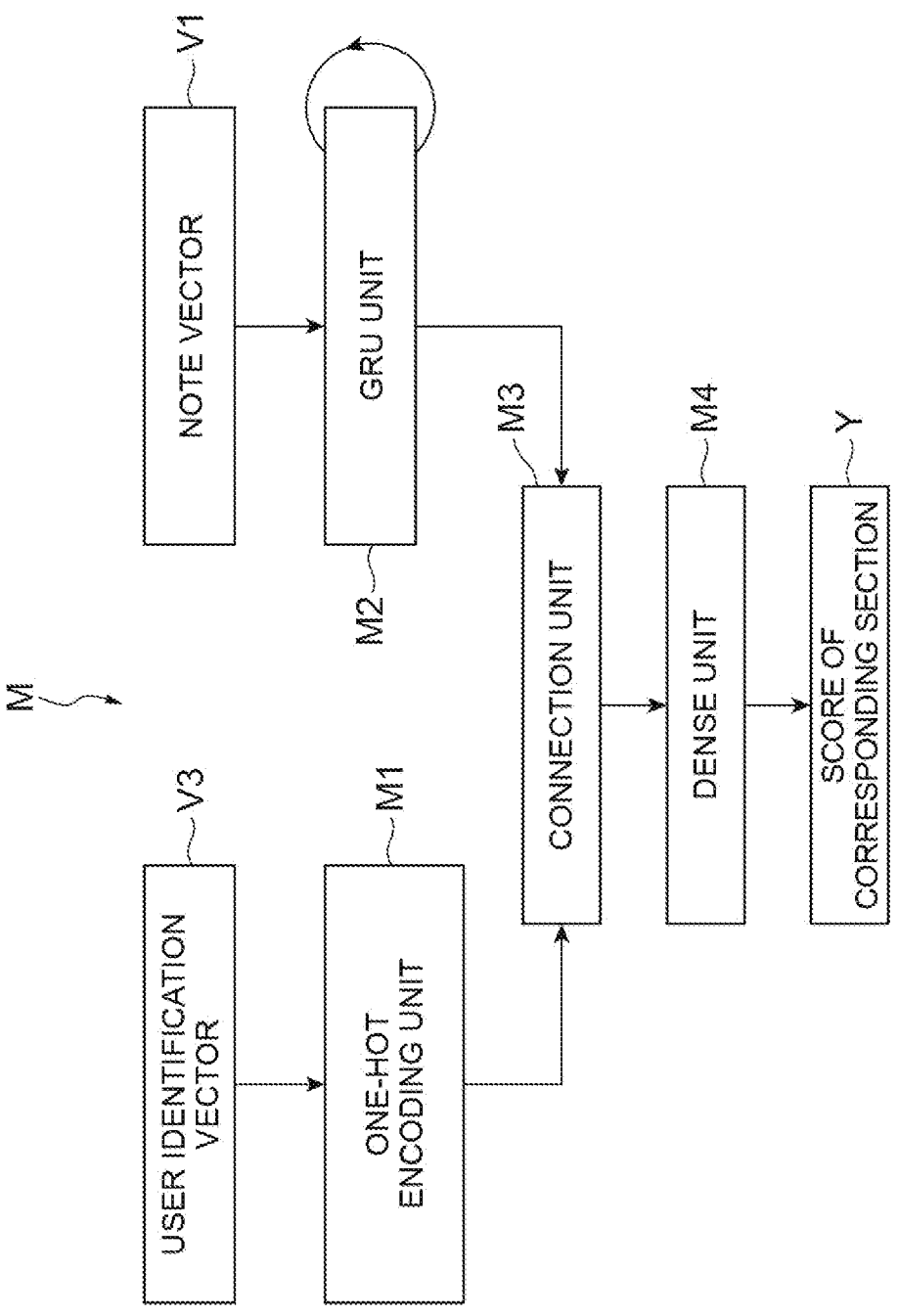
FIG. 7 is a diagram illustrating a configuration of a learning model used by the prediction device 5.

FIG. 7 illustrates a configuration of a learning model M used by the model building unit 202. As illustrated in FIG. 7, the learning model M is composed of a one-hot encoding unit M1, a GRU unit M2, a connection unit M3, and a dense unit M4.

The one-hot encoding unit M1 receives the user identification vector V3 as an input and converts the user identification vector V3 into a two-dimensional vector. FIG. 8 illustrates an example of a data configuration of a two-dimensional vector acquired by conversion performed by the one-hot encoding unit M1. In this way, in the two-dimensional vector, each row corresponds to a note represented by each element of the note vector V1, and each column corresponds to each user represented by each element of the user identification vector V3. For example, in a case in which "user identifier" of one element included in the user identification vector V3 is "A1", in a row corresponding to the element, a value of a column corresponding to "user identifier A1" is set to "1", and values of columns corresponding to other user identifiers are set to "0". A two-dimensional vector of rows corresponding to all the elements included in the user identification vector V3 is generated by the one-hot encoding unit M1.

The GRU unit M2 is one type of recurrent neural network (RNN), outputs a state in addition to a normal output, and, as an input, receives a state that has been previously output as an input again in addition to a note vector V1 as a normal input. In accordance with this, the GRU unit M2 has a function of storing past input information and can process long-term time series information.

Figure 9:
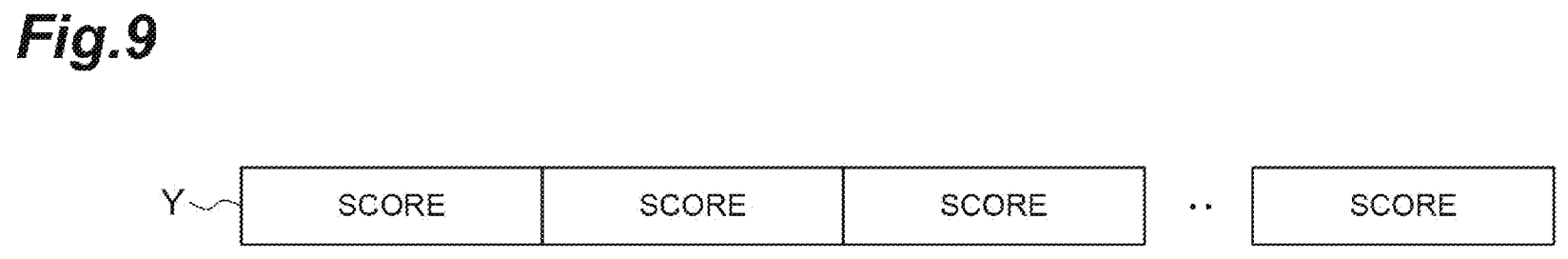

The connection unit M3 couples an output of the one-hot encoding unit M1 with an output of the GRU unit M2. The dense unit M4 is a fully-connected layer in deep learning, multiplies a numerical string of a certain number of dimensions output from the connection unit M3 by a weight (w) and adds a bias (b) to a result thereof, thereby converting the numerical string into an output (Y) of an arbitrary number of dimensions. In this embodiment, the dense unit M4 converts data into a one-dimensional output vector Y in which a result (score) of scoring of each section of a musical piece is aligned. FIG. 9 illustrates an example of a data configuration of an output vector converted by the dense unit M4. In this way, in the output vector (Y), each element represents a prediction value of a result of scoring of each section configured by a note corresponding to an element of the input note vector V1.

The model building unit 202 inputs a user identification vector V3 and a note vector V1 to the learning model M by using the learning model M having the configuration described above and trains the learning model M such that an output vector (Y) acquired as a result thereof becomes close to a score of each section represented by a score vector V2. As a result of the training, for example, parameters of the weight (w) and the bias (b) in the dense unit M4 of the learning model M are optimized.

Referring back to FIG. 1, the prediction unit 203 acquires a predicted value of a result of scoring of each section relating to a user's singing of a new musical piece using the learning model M built by the model building unit 202 on the basis of musical piece information about the new musical piece. More specifically, the prediction unit 203 performs preprocessing similar to the model building unit 202 for musical piece information as a target and generates a note vector V1 and a user identification vector V3 relating to a new musical piece. Then, the prediction unit 203 acquires a predicted value of a result of scoring of each section of a new musical piece on the basis of an output vector (Y) acquired by inputting the note vector V1 and the user identification vector V3, which have been generated, to the learning model M.

The selection information generating unit 204 repeatedly acquires a predicted value of scoring information of each section relating to a plurality of musical pieces from the prediction unit 203 and calculates a predicted value of a result of scoring of an entire musical piece for each of the plurality of musical pieces. For example, as a predicted value of a result of scoring of the entire musical piece, an average value of predicted values of results of scoring of all the sections is calculated. Then, the selection information generating unit 204 selects a musical piece to be recommended to sing among a plurality of musical pieces for a user and outputs selection information representing the selected musical piece together with a predicted value of a result of scoring of the entire musical piece for each of a plurality of musical pieces. For example, the selection information generating unit 204 selects a musical piece of which a predicted value of a result of scoring is relatively high, a musical piece of which a predicted value of a result of scoring is higher than a threshold set in advance, and the like as musical pieces recommended to a user. The selection information and the information of a predicted value output by the selection information generating unit 204 are output to a terminal device of the front server 3 and the like.

Figure 10:
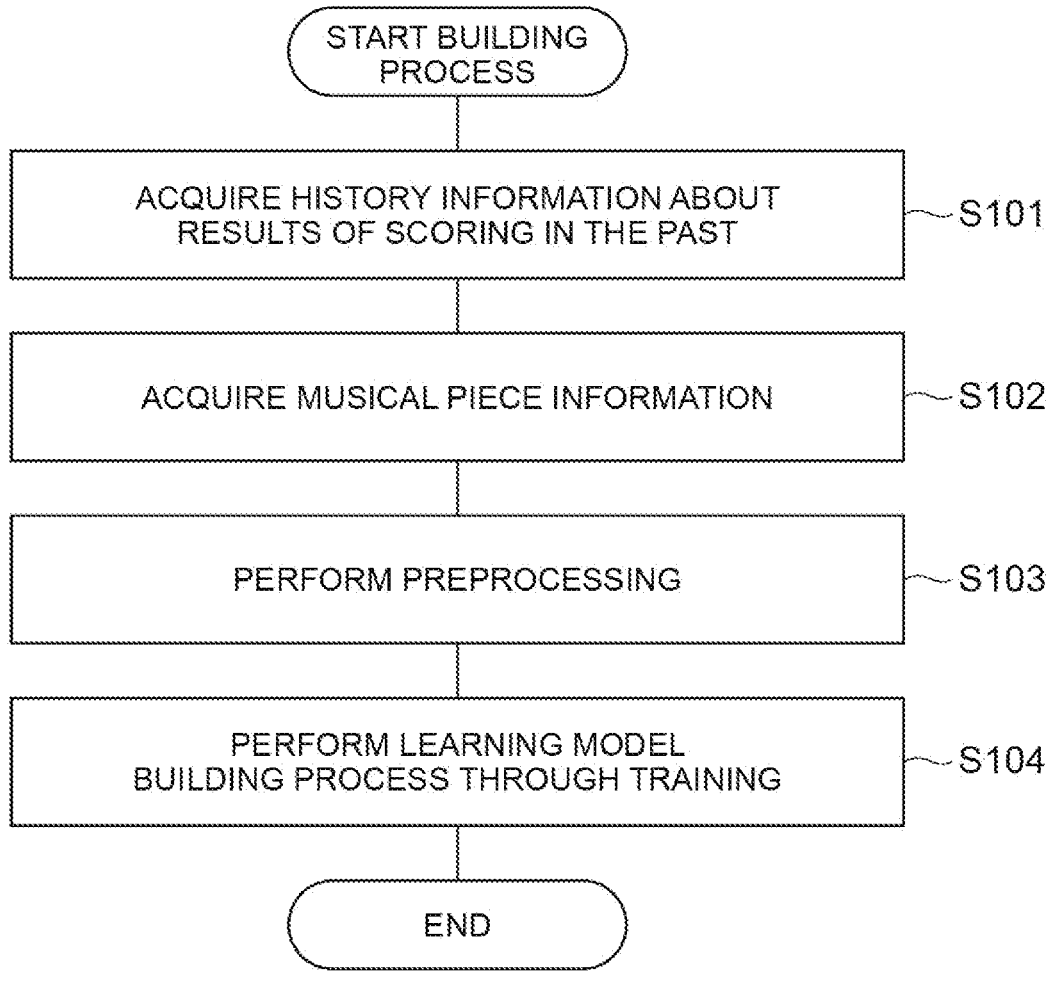
FIG. 10 is a flowchart illustrating an order of a learning model building process using the prediction device 5.
Figure 11:
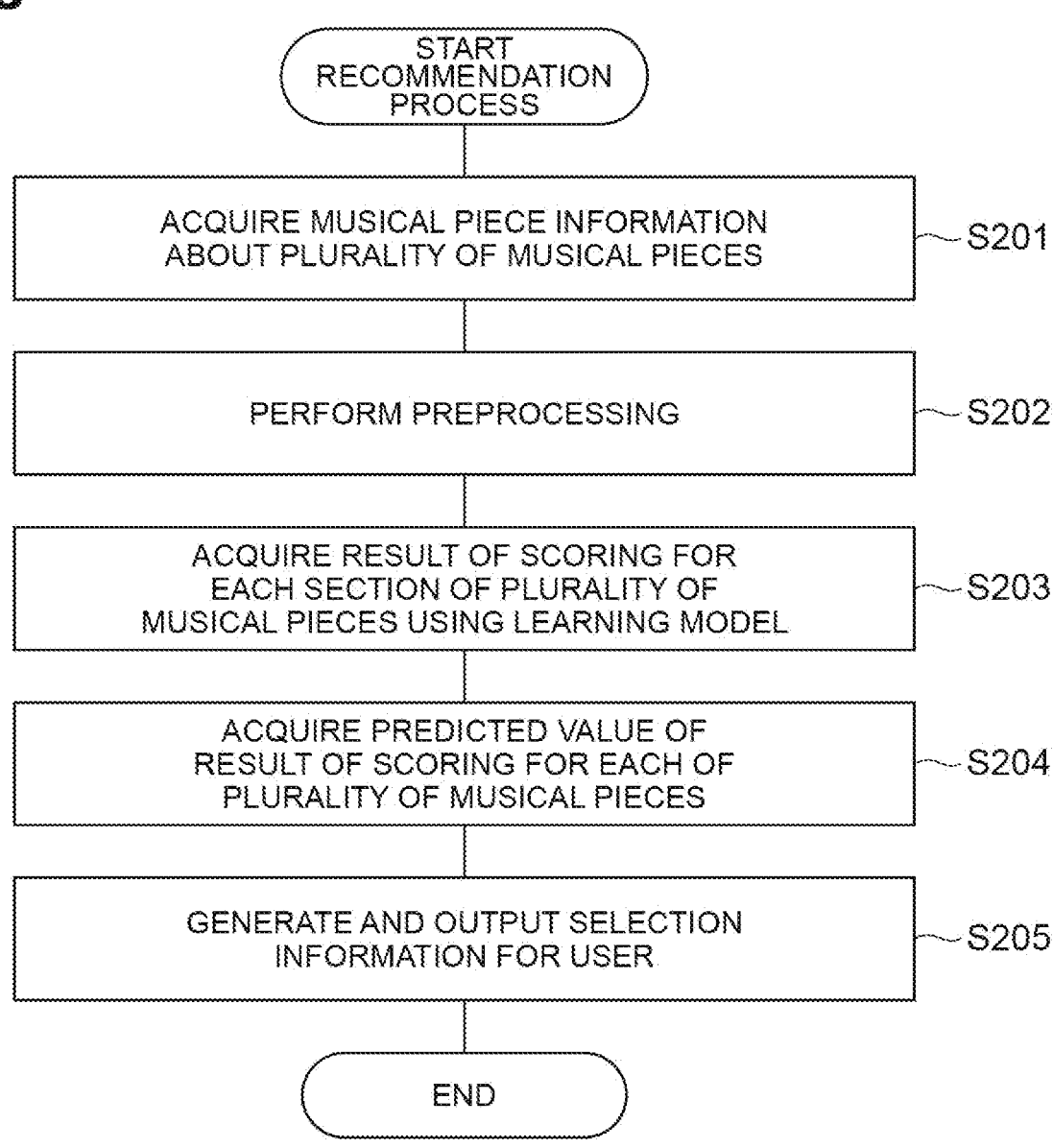
FIG. 11 is a flowchart illustrating an order of a musical piece-related recommendation process using the prediction device 5.

Next, a process of the prediction device 5 configured in this way will be described. FIG. 10 is a flowchart illustrating an order of a learning model building process using the prediction device 5, and FIG. 11 is a flowchart illustrating an order of a musical piece-related recommendation process using the prediction device 5. The learning model building process starts at a timing set in advance (for example, a regular timing), a timing at which history information of an information amount of a certain degree is accumulated in the data management device 4, or the like. The musical piece-related recommendation process starts at a timing set in advance, a timing at which an instruction is received from a user by the front server 3, or the like.

Referring to FIG. 10, when the learning model building process starts, history information about a result of scoring of a user's singing of a musical piece in the past is acquired from the data management device 4 using the data acquiring unit 201 (Step S101). In addition, musical piece information about musical pieces recorded in the history information is acquired from the data management device 4 using the data acquiring unit 201 (Step S102).

Next, preprocessing is performed using the model building unit 202, and a note vector V1, a score vector V2, and a user identification vector V3 are generated on the basis of the history information and the musical piece information (Step S103). Thereafter, the learning model M is trained using the note vector V1, the score vector V2, and the user identification vector V3 by the model building unit 202, whereby the parameters of the learning model M are optimized (building of a learning model; Step S104), and the learning model building process ends.

Next, referring to FIG. 11, when a musical piece-related recommendation process starts, musical piece information about a plurality of musical pieces is acquired from the data management device 4 using the data acquiring unit 201 (Step S201). Thereafter, preprocessing is performed using the prediction unit 203, and a note vector V1 is generated on the basis of the musical piece information, and a user identification vector V3 used for identifying a user who is a prediction target of a result of scoring corresponding to elements corresponding to the note vector V1 is generated (Step S202).

Next, by using the prediction unit 203, a predicted value of a result of scoring for each section of a plurality of musical pieces is acquired on the basis of an output vector of the learning model M by inputting the note vector V1 and the user identification vector V3 to the learning model M (Step S203). Thereafter, by using the selection information generating unit 204, a predicted value of a result of scoring of an entire musical piece is calculated on the basis of a predicted value of a result of scoring for each section of the plurality of musical pieces for each of the plurality of musical pieces (Step S204). Finally, by using the selection information generating unit 204, a musical piece to be recommended to sing for a user is selected on the basis of predicted values of results of scoring for a plurality of musical pieces, and selection information for the user is generated and output (Step S205).

Next, operations and effects of the prediction device 5 according to this embodiment will be described. According to this prediction device 5, a learning model M predicting a result of scoring is built by using a result of scoring for each section relating to a user's singing of musical pieces in the past and pitch information for each section as training data. Then, by inputting pitch information about a new musical piece to the built learning model M, a result of scoring relating to a user's singing of a new musical piece is acquired on the basis of the output thereof. In accordance with this, a result of scoring relating to singing of a new musical piece in which a scoring trend for a user's pattern of pitches in the past is reflected can be acquired, and accuracy of prediction of the acquired result of scoring can be improved.

In addition, in this embodiment, a learning model M that has pitch information of a time series as an input and outputs a result of scoring for each section of a musical piece corresponding to the pitch information is used, and the learning model M is built such that the output of the learning model M becomes close to a result of scoring for each section included in training data. In this way, the learning model M taking the trend of a result of scoring for a pattern of a pitch for each section of a musical piece can be built, and accuracy of prediction of a result of scoring relating to a user's singing of a new musical piece can be reliably improved.

In addition, in this embodiment, the learning model M that further receives identification information of a user as an input is used. In this way, the learning model M taking the trend of a result of scoring for a pattern of pitches for each user can be built, and accuracy of prediction of result of scoring for each user as a target can be reliably improved.

Furthermore, in this embodiment, a result of scoring relating to a user's singing of a new musical piece is acquired by averaging results of scoring for each section of the new musical piece that are outputs of the learning model M. In this way, strengths and weaknesses of a user relating to singing of a new musical piece can be easily determined.

In addition, in this embodiment, results of scoring relating to a user's singing of a plurality of musical pieces are repeatedly acquired, and a musical piece to be recommended to the user is selected among a plurality of musical pieces on the basis of the results of scoring and selection information is output. According to such a configuration, a musical piece of which a user is predicted to be good at singing can be selected and output from among a plurality of musical pieces, and information that is beneficial to the user at the time of singing can be provided.

Each block diagram used for description of the embodiment described above illustrates blocks in units of functions. Such functional blocks (component units) are realized by an arbitrary combination of at least one of hardware and software. In addition, a method for realizing each functional block is not particularly limited. In other words, each functional block may be realized by using one device that is combined physically or logically or using a plurality of devices by directly or indirectly (for example, using a wire or wirelessly) connecting two or more devices separated physically or logically. A functional block may be realized by one device or a plurality of devices described above and software in combination.

As functions, there are deciding, determining, judging, computing, calculating, processing, deriving, inspecting, searching, checking, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like, and the functions are not limited thereto. For example, a functional block (constituent unit) enabling transmission to function is referred to as a transmitting unit or a transmitter. As described above, a method for realizing all the functions is not particularly limited.

Figure 12:
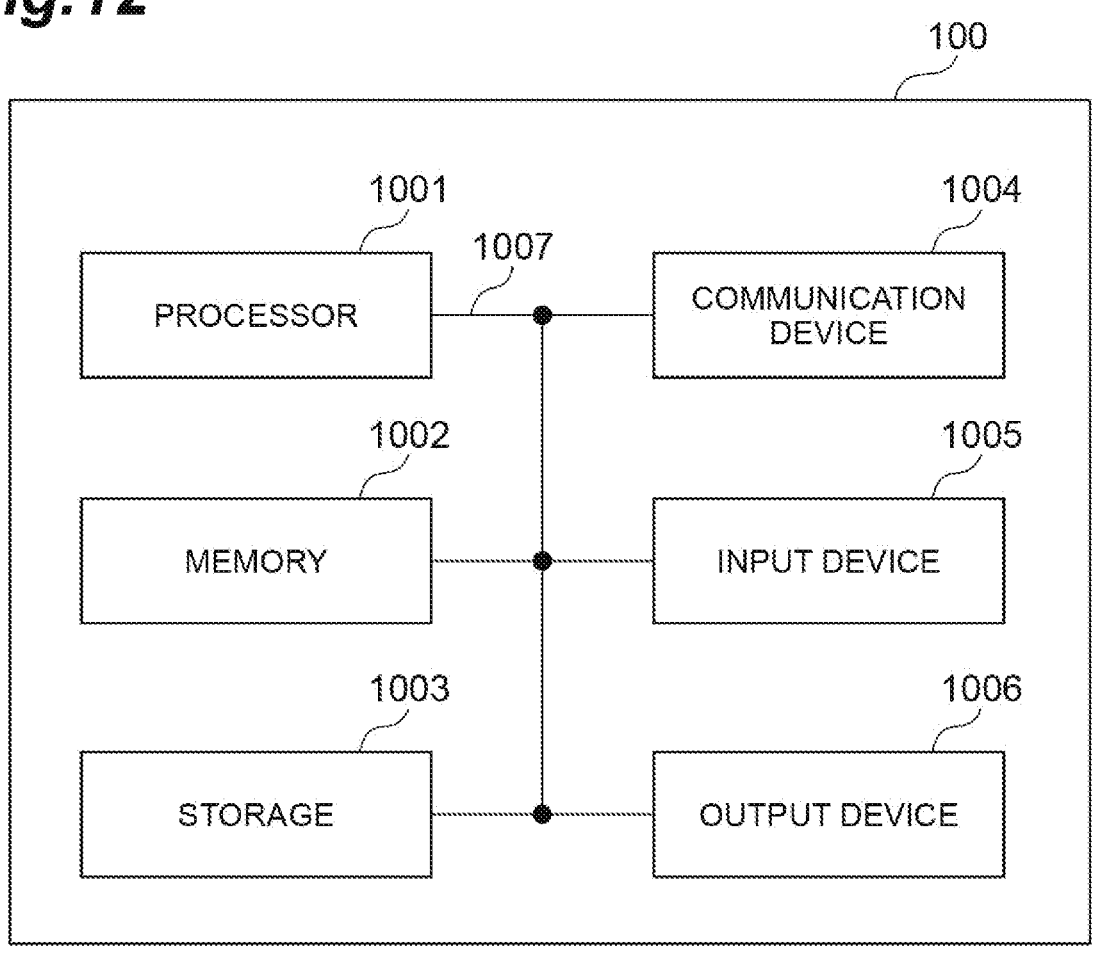
FIG. 12 is a diagram illustrating an example of a hardware configuration of the data management device 4 and the prediction device 5 according to one embodiment of the present disclosure.

For example, the data management device 4 and the prediction device 5 according to an embodiment of the present disclosure may function as a computer that performs information processing of the present disclosure. FIG. 12 is a diagram illustrating an example of a hardware configuration of the data management device 4 and the prediction device 5 according to an embodiment of the present disclosure. The data management device 4 and the prediction device 5 described above, physically, may be configured as a computer device including a processor 1001, a memory 1002, a storage 1003, a communication device 1004, an input device 1005, an output device 1006, a bus 1007, and the like.

In addition, in the following description, a term "device" may be rephrased as a circuit, a device, a unit, or the like. The hardware configuration of the data management device 4 and the prediction device 5 may be configured to include one or a plurality of devices illustrated in the drawing and may be configured without including some of these devices.

Each function of the data management device 4 and the prediction device 5 may be realized when the processor 1001 performs an arithmetic operation by causing predetermined software (a program) to be read onto hardware such as the processor 1001, the memory 1002, and the like, controls communication using the communication device 1004, and controls at least one of data reading and data writing for the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like. For example, the data acquiring unit 201, the model building unit 202, the prediction unit 203, the selection information generating unit 204, and the like described above may be realized by the processor 1001.

In addition, the processor 1001 reads a program (program code), a software module, data, and the like from at least one of the storage 1003 and the communication device 1004 into the memory 1002 and executes various processes in accordance with these. As the program, a program causing a computer to execute at least some of the operations described in the embodiment described above is used. For example, the data acquiring unit 201, the model building unit 202, the prediction unit 203, and the selection information generating unit 204 may be realized by a control program that is stored in the memory 1002 and operated by the processor 1001, and other functional blocks may be realized similarly as well. Although the various processes described above have been described as being executed by one processor 1001, the processes may be executed simultaneously or sequentially by two or more processors 1001. The processor 1001 may be realized using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable for performing the building process and the recommendation process according to one embodiment of the present disclosure.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database, a server, or any other appropriate medium, including at least one of the memory 1002 and a storage 1003.

The communication device 1004 is hardware (a transmission/reception device) for performing inter-computer communication through at least one of a wired network and a wireless network and, for example, may be called also a network device, a network controller, a network card, a communication module, or the like. The communication device 1004, for example, in order to realize at least one of frequency division duplex (FDD) and time division duplex (TDD), may be configured to include a high frequency switch, a duplexer, a filter, a frequency synthesizer, and the like. For example, the data acquiring unit 201 and the like that receive the information described above may be realized using the communication device 1004. This data acquiring unit 201 may be mounted with being physically or logically divided into a transmission unit and a reception unit.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. For example, the selection information generating unit 204 and the like described above may be realized using the output device 1006. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or buses different between devices.

In addition, the data management device 4 and the prediction device 5 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 1001 may be mounted using at least one of such hardware components.

Notification of information is not limited to an aspect/embodiment described in the present disclosure and may be performed using a difference method. For example, the notification of information may be performed using physical layer signaling (for example, downlink control information (DCI), uplink control information (UCI)), upper layer signaling (for example, radio resource control (RRC) signaling, medium access control (MAC) signaling, annunciation signal (a master information block (MIB), a system information block (SIB))), any other signal, or a combination thereof. In addition, the RRC signaling may be referred to as a RRC message and, for example, may be an RRC connection setup message, an RRC connection reconfiguration message, or the like.

Each aspect/embodiment described in the present disclosure may be applied to at least one of long term evolution (LTE), LTE-advanced (LTE-A), Super 3G, IMT-advanced, a 4-th generation mobile communication system (4G), a 5th generation mobile communication system (5G), future ratio access (FRA), new radio (NR), W-CDMA (Registered trademark), GSM (registered trademark), CDMA 2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using another appropriate system and a next generation system extended based on these. In addition, a plurality of systems may be combined (for example, a combination of at least one of LTE and LTE-A and 5G or the like) for an application.

The processing sequence, the sequence, the flowchart, and the like of each aspect/embodiment described in the present disclosure may be changed in order as long as there is no contradiction. For example, in a method described in the present disclosure, elements of various steps are presented in an exemplary order, and the method is not limited to the presented specific order.

Information and the like may be output from an upper layer (or a lower layer) to a lower layer (or an upper layer). The information and the like may be input and output through a plurality of network nodes.

The input/output information and the like may be stored in a specific place (for example, a memory) or managed using a management table. The input/output information and the like may be overwritten, updated, or added to. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in the present disclosure may be individually used, used in combination, or be switched therebetween in accordance with execution. In addition, a notification of predetermined information (for example, a notification of being X) is not limited to being performed explicitly and may be performed implicitly (for example, a notification of the predetermined information is not performed).

As above, while the present disclosure has been described in detail, it is apparent to a person skilled in the art that the present disclosure is not limited to the embodiments described in the present disclosure. The present disclosure may be modified or changed without departing from the concept and the scope of the present disclosure set in accordance with the claims. Thus, the description presented in the present disclosure is for the purpose of exemplary description and does not have any limited meaning for the present disclosure.

It is apparent that software, regardless of whether it is called software, firmware, middleware, a microcode, a hardware description language, or any other name, may be widely interpreted to mean a command, a command set, a code, a code segment, a program code, a program, a sub-program, a software module, an application, a software application, a software package, a routine, a subroutine, an object, an executable file, an execution thread, an order, a function, and the like.

In addition, software, a command, information, and the like may be transmitted and received via a transmission medium. For example, in a case in which software is transmitted from a website, a server, or any other remote source using at least one of a wired technology (such as a coaxial cable, an optical fiber cable, a twisted pair, a digital subscriber line (DSL) or the like) and a radio technology (such as infrared rays, microwaves, or the like), at least one of such a wired technology and a radio technology is included in the definition of the transmission medium.

Information, a signal, and the like described in the present disclosure may be represented using any one among other various technologies. For example, data, an instruction, a command, information, a signal, a bit, a symbol, a chip, and the like described over the entire description presented above may be represented using a voltage, a current, radio-waves, a magnetic field or magnetic particles, an optical field or photons, or an arbitrary combination thereof.

In addition, a term described in the present disclosure and a term that is necessary for understanding the present disclosure may be substituted with terms having the same meaning or a meaning similar thereto. For example, at least one of a channel and a symbol may be a signal (signaling). For example, a signal may be a message. In addition, a component carrier (CC) may be referred to as a carrier frequency, a cell, a frequency carrier, or the like.

Terms such as "system" and "network" used in the present disclosure are interchangeably used.

In addition, information, a parameter, and the like described in the present disclosure may be represented using absolute values, relative values with respect to predetermined values, or other corresponding information. For example, radio resources may be directed using indices.

A name used for each parameter described above is not limited in any aspect. In addition, numerical equations using such parameters may be different from those that are explicitly disclosed in the present disclosure. Various channels (for example, a PUCCH, a PDCCH, and the like) and information elements can be identified using all the preferred names, and various names assigned to such various channels and information elements are not limited in any aspect.

Terms such as "determining" used in the present disclosure may include various operations of various types. The "deciding" and "determining", for example, may include a case in which judging, calculating, computing, processing, deriving, investigating, looking up, search, and inquiry (for example, looking up a table, a database, or any other data structure), or ascertaining is regarded as "deciding" and "determining". In addition, "deciding" and "determining" may include a case in which receiving (for example, receiving information), transmitting (for example, transmitting information), input, output, or accessing (for example, accessing data in a memory) is regarded as "deciding: and "determining". Furthermore, "deciding" and "determining" may include a case in which resolving, selecting, choosing, establishing, comparing, or the like is regarded as "deciding" and "determining". In other words, "deciding" and "determining" includes a case in which a certain operation is regarded as "deciding" and "determining". In addition, "deciding (determining)" may be rephrased with "assuming", "expecting", "considering", and the like.

Terms such as "connected" or "coupled" or all the modifications thereof mean all the kinds of direct or indirect connection or coupling between two or more elements and may include presence of one or more intermediate elements between two elements that are mutually "connected" or "coupled". Coupling or connection between elements may be physical coupling or connection, logical coupling or connection, or a combination thereof. For example, "connection" may be rephrased with "access". When used in the present disclosure, two elements may be considered as being mutually "connected" or "coupled" by using one or more wires and at least one of a cable and a print electric connection and, as several non-limiting and non-comprehensive examples, by using electromagnetic energy such as electromagnetic energy having wavelengths in a radio frequency region, a microwave region, and a light (both visible light and non-visible light) region.

Description of "on the basis of" used in the present disclosure does not mean "only on the basis of" unless otherwise mentioned. In other words, description of "on the basis of" means both "only on the basis of" and "on the basis of at least."

In a case in which "include," "including," and modifications thereof are used in the present disclosure, such terms are intended to be inclusive like a term "comprising." In addition, a term "or" used in the present disclosure is intended to be not an exclusive OR.

In the present disclosure, for example, in a case in which an article such as "a," "an," or "the" in English is added through a translation, the present disclosure may include a plural form of a noun following such an article.

In the present disclosure, a term "A and B are different" may means that "A and B are different from each other". In addition, the term may mean that "A and B are different from C". Terms "separated", "combined", and the like may be interpreted similar to "different".

INDUSTRIAL APPLICABILITY

One embodiment of the present invention is used for a prediction device predicting a result of scoring and enables improvement of accuracy of prediction of a result of scoring of a user's singing of a new musical piece.

REFERENCE SIGNS LIST

5 Prediction device
1001 Processor
201 Data acquiring unit
202 Model building unit
203 Prediction unit
204 Selection information generating unit
M Learning model

The invention claimed is:

1. A prediction device predicting a result of scoring, the prediction device comprising:
   at least one processor,
   the at least one processor being configured to:
   acquire a result of scoring relating to a user's singing of a musical piece in the past for each of a plurality of sections of the musical piece, wherein each section is defined by a time interval;
   acquire pitch information representing pitches of notes included in the musical piece and aligned in a time series in each of the plurality of section;

build a learning model predicting a result of scoring relating to the user's singing of a new musical piece using the result of scoring and the pitch information of the musical piece sung in the past as training data; and
   acquire a result of scoring relating to the user's singing of the new musical piece on the basis of an output of the learning model by inputting pitch information about the new musical piece to the learning model.

2. The prediction device according to claim 1, wherein the at least one processor builds the learning model such that the output of the learning model becomes close to a result of scoring for each section included in the training data, wherein the learning model outputs a result of scoring for each of the new musical piece corresponding to the pitch information.

3. The prediction device according to claim 2, wherein the at least one processor acquires the result of scoring relating to the user's singing of the new musical piece by averaging results of scoring for each sections of the new musical piece that are outputs of the learning model.

4. The prediction device according to claim 1, wherein the learning model further receives identification information of the user as an input.

5. The prediction device according to claim 1, wherein the at least one processor repeatedly acquires results of scoring relating to the user's singing of a plurality of new musical pieces, selects one of the new musical pieces to be recommended to the user on the basis of the results of scoring, and outputs selection information identifying the selected musical piece.

6. A method, implemented by at least one processor of a prediction device predicting a result of scoring, the method comprising:
   acquiring a result of scoring relating to a user's singing of a musical piece in the past for each of a plurality of sections of the musical piece, wherein each section is defined by a time interval;
   acquiring pitch information representing pitches of notes included in the musical piece and aligned in a time series in each of the plurality of sections;
   building a learning model predicting a result of scoring relating to the user's singing of a new musical piece using the result of scoring and the pitch information of the musical piece sung in the past as training data; and
   acquiring a result of scoring relating to the user's singing of the new musical piece on the basis of an output of the learning model by inputting pitch information about the new musical piece to the learning model.

* * * * *